US007908267B2

(12) United States Patent
Jenkins, Jr. et al.

(10) Patent No.: US 7,908,267 B2
(45) Date of Patent: Mar. 15, 2011

(54) AUTOMATIC USE OF A FUNCTIONAL INDEX AS A PRIMARY FILTER

(75) Inventors: Robert J. Jenkins, Jr., Foster City, CA (US); Adiel Yoaz, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 628 days.

(21) Appl. No.: 10/929,065

(22) Filed: Aug. 26, 2004

(65) Prior Publication Data

US 2005/0256835 A1 Nov. 17, 2005

Related U.S. Application Data

(60) Provisional application No. 60/571,071, filed on May 14, 2004.

(51) Int. Cl.
*G06F 7/00* (2006.01)
*G06F 17/30* (2006.01)

(52) U.S. Cl. ......... 707/715; 707/705; 707/713; 707/718; 707/719

(58) Field of Classification Search .............. 707/1, 3–5, 707/10, 100, 102, 104.1, 200; 709/203, 210–215
See application file for complete search history.

(56) References Cited

U.S. PATENT DOCUMENTS

| 5,404,510 | A | * | 4/1995 | Smith et al. ................... 707/2 |
| 5,604,901 | A | * | 2/1997 | Kelley et al. .......... 707/999.003 |
| 5,659,730 | A | * | 8/1997 | Kelley et al. .......... 707/999.003 |
| 5,666,528 | A | * | 9/1997 | Thai ............................ 707/102 |
| 5,926,813 | A | * | 7/1999 | Chaudhuri et al. ............... 707/5 |
| 6,223,171 | B1 | * | 4/2001 | Chaudhuri et al. ............... 707/2 |
| 6,339,769 | B1 | * | 1/2002 | Cochrane et al. ................ 707/2 |
| 6,341,281 | B1 | * | 1/2002 | MacNicol et al. ................ 707/3 |

(Continued)

FOREIGN PATENT DOCUMENTS

CA 2124094 * 11/1995

(Continued)

OTHER PUBLICATIONS

Kai-Uwe Sattler et al. "autonomous query-driven index tuning", proceedings of the international databae engineering and applications symposium, 2004.*

(Continued)

*Primary Examiner* — Tim T. Vo
*Assistant Examiner* — Garrett Smith
(74) *Attorney, Agent, or Firm* — Hickman Palermo Truong & Becker LLP (57) ABSTRACT

An approach for using functional indexes as a primary filter is provided. A database query that contains a reference to a column of a table, but does not contain any reference to a functional index based on that column, is received by a database server. The database server adds to the database query a reference to the functional index on the column. The database server determines if the database query should be executed using the functional index. If the database server determines that the database query should be executed using the functional index, then the database query is executed with the functional index. If the database server determines that the database query should not be executed using the functional index, then data that indicates that the functional index is not to be evaluated when the database query is executed is stored.

18 Claims, 3 Drawing Sheets

U.S. PATENT DOCUMENTS

| | | | |
|---|---|---|---|
| 6,345,266 B1 * | 2/2002 | Ganguly et al. | 707/1 |
| 6,385,603 B1 * | 5/2002 | Chen et al. | 707/3 |
| 6,421,662 B1 * | 7/2002 | Karten | 707/3 |
| 6,615,206 B1 * | 9/2003 | Jakobsson et al. | 707/3 |
| 6,629,132 B1 * | 9/2003 | Ganguly et al. | 709/213 |
| 6,728,747 B1 * | 4/2004 | Jenkins et al. | 718/101 |
| 6,823,329 B2 * | 11/2004 | Kirk et al. | 707/2 |
| 7,103,590 B1 * | 9/2006 | Murthy et al. | 707/3 |
| 7,213,011 B1 * | 5/2007 | Das | 707/999.004 |
| 2001/0032199 A1 * | 10/2001 | Delo | 707/3 |
| 2005/0131880 A1 * | 6/2005 | Yoaz et al. | 707/3 |
| 2005/0154715 A1 * | 7/2005 | Yoaz et al. | 707/3 |

FOREIGN PATENT DOCUMENTS

| | | | |
|---|---|---|---|
| CA | 2416368 | * | 10/2003 |

OTHER PUBLICATIONS

Paulley, G.N et al. "exploiting uniqueness in query optimization", proceedings, 10th internatinal conference on data engineering, 1994, pp. 68-79.*

Ming-Syan Chen et al. "applying segmented right-deep trees to pipelining multiple hash joins", IEEE transactions on knowledge and data engineering, vol. 7, No. 4, 1995vol. 7, issue: 4, 1995, pp. 656-668.*

"Oracle Function Based Indexes"; from http://web.archive.org/web/20040624041828/http://www.akadia.com/services/ora_function_based_index_2.html.*

* cited by examiner

AUTOMATIC USE OF A FUNCTIONAL INDEX AS A PRIMARY FILTER

RELATED APPLICATIONS

The application claims priority from U.S. Provisional Application No. 60/571,071, entitled "Automatic use of Functional Indexes as Primary Filters," filed on May 14, 2004 by Robert Jenkins, et al., the contents of which are incorporated by reference.

FIELD OF THE INVENTION

The present invention relates to the automatic use of a functional index in executing a database query that does not specify the functional index.

BACKGROUND

An index is a list of keys, each of which identifies a unique database record. An index is based on one or more columns of a database table. Indexes are useful because using an index on a database table to find specific records in the table, and to sort records of the table by columns of the table on which index is based, is faster than performing the same actions without using the index.

Often, an index cannot be created on a table. For example, the size of the data stored in the table may be too large, or the data stored in the table may be of an abstract type. In such a case, a functional index may still be used. A functional index is an index that is defined on the result of a function applied to one or more columns of a database table.

The functional index may be used as a primary filter for the evaluation of certain comparative operators contained within a database query. For example, if there exists a functional index "f(col1)" on a column named col1 of a table, then the functional index may be used to evaluate the predicate "col1=<value>." The functional index may be used in processing a database query containing the predicate to obtain a set of rows that satisfy the predicate by evaluating the functional index using the predicate (i.e., f(col1)=f(<value>)). While the rows returned by the functional index ("the returned rows") may contain additional rows that do not satisfy the predicate "col1=<value>," the returned rows are guaranteed to contain all the rows of the table that do satisfy the predicate. Each of the returned rows may then be examined to determine if, for a particular row, the predicate "col1=<value>" is true. Examining only the returned rows is more efficient than examining each row of a table identified in the database query. Thus, the query may be processed faster and more efficiently using the functional index.

Currently, a functional index may only be used by a database server if the left hand side or right hand side of the condition referenced in the query is the same as the expression used for the functional index. This limitation reduces the utility of functional indexes. For example, an index cannot be created on columns storing string data larger than the maximum index key size, but a functional index may be created on a prefix of the string data stored in the columns. However, the database server will not consider the functional index in creating the execution plan of a database query that only references the string column name without the prefix function. Consequently, an approach to use functional indexes without incurring the problems associated with prior approaches is desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments described herein are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Architecture Overview

Figure 1:
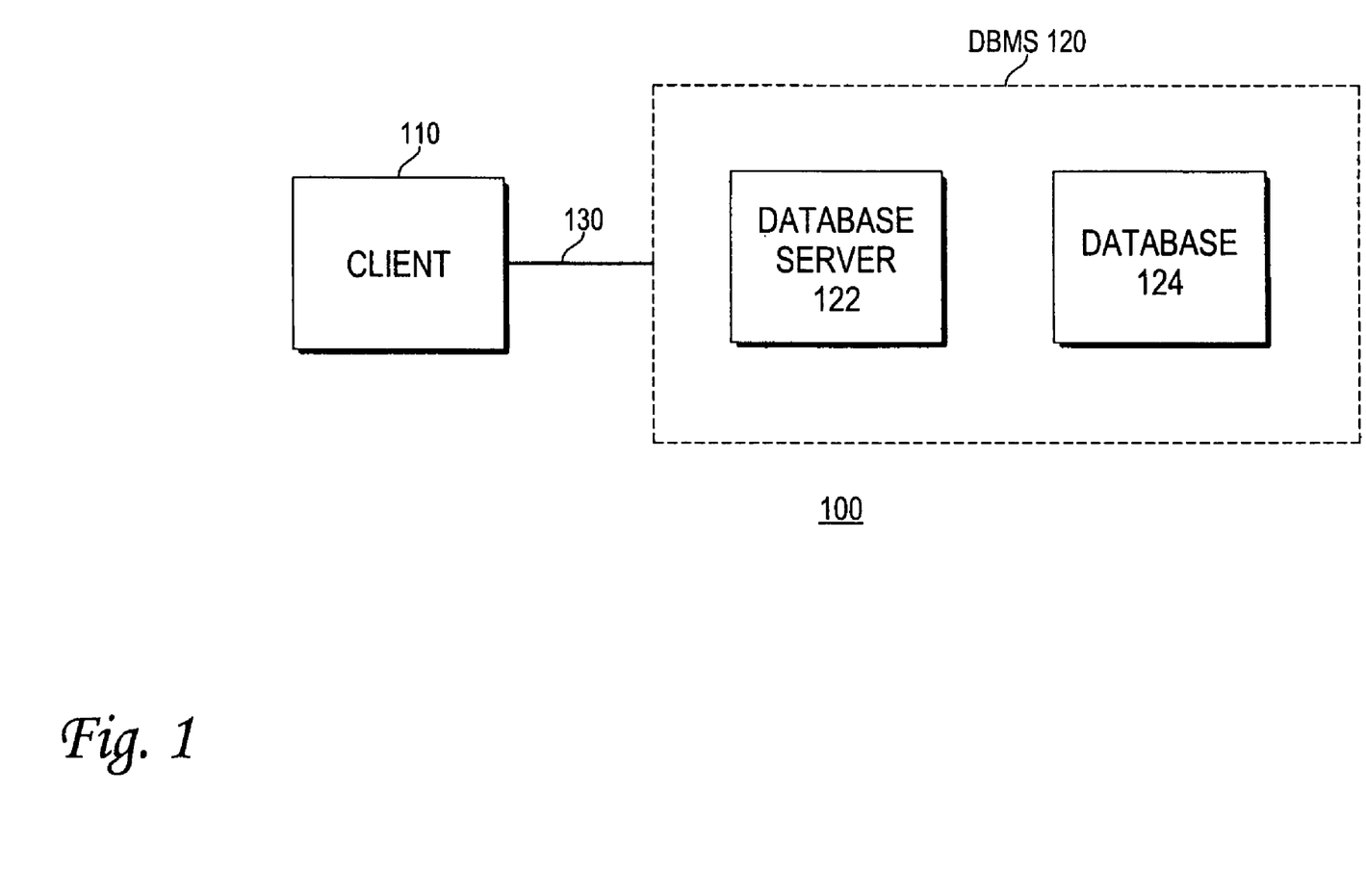
FIG. 1 is a block diagram of a system according to an embodiment.

FIG. 1 is a block diagram of a system 100 according to an embodiment. The system 100 may use a functional index as a primary filter when executing a database query, thereby executing the database query with improved efficiency and speed. The system 100 includes a client 110, a database management system 120, and a communications link 130. The database management system 120 comprises a database server 122 and a database 124.

Client 110 may be implemented by any medium or mechanism that provides for transmitting a database query to a database management system. Non-limiting, illustrative examples of a client include a PC, a wireless device, a software application, and a computer system. While only one client 110 is shown in FIG. 1, system 100 may include any number of clients 110.

Database management system (hereinafter abbreviated as "DBMS") 120 may be implemented by any medium or mechanism that provides for persistently storing and retrieving data. DBMS 120 includes a database server 122 and a database 124.

Database server 122 may be implemented by any medium or mechanism that provides for receiving database queries and retrieving data from a database. In an embodiment, database server 122 may contain a query optimizer, which is a functional component that determines the optimal execution plan for a database query. While only one database server 122 is shown in FIG. 1, DBMS 120 may include two or more database servers 122.

Database 124 may be implemented by any medium or mechanism that provides for persistently storing data in an organized fashion. Non-limiting, illustrative examples of database 124 include a relational database, an object-oriented database, and a multi-dimensional database. While only one database 124 is shown in FIG. 1, DBMS 120 may include two or more databases 124.

Communications link 130 may be implemented by any medium or mechanism that provides for the exchange of data between client 110 and DBMS 120. Examples of communications link 130 include, without limitation, a network such as a Local Area Network (LAN), Wide Area Network (WAN), Ethernet or the Internet, or one or more terrestrial, satellite or wireless links.

Functional Overview

Embodiments allow a database query to be executed using a functional index, even if the database query, as it was received by the database server, does not contain a reference to the functional index. According to an embodiment, a database query, such as:

select * from t1 where c1='a';

is amended by the database server to include reference to a functional index, e.g.:

select * from t1 where c1='a' and substr(c1, 1, 5)=substr ('a', 1, 5);

if a functional index exists on the expression "substr(c1, 1, 5)." Note that this illustrative index is described below in example 1.

The database server may use the functional index in the execution of the amended database query. The functional index acts as a primary filter in that the rows returned by the evaluation of the functional index (the "returned rows") are guaranteed to contain all the rows that satisfy the original condition (in the above example, where c1='a'), but the returned rows may also contain rows that do not satisfy the original condition. The database server may then evaluate the returned rows to see which of the returned rows satisfy the original condition. As the returned rows may be but a small portion of the data stored by the original table(s) referenced by the database query, the efficiency and speed of processing the database query are enhanced.

More specifically, in an embodiment, a database query that contains a reference to a column of a table, but does not contain any reference to a functional index based on that column, is received by a database server. The database server adds to the database query a reference to the functional index on the column.

In order to achieve the most optimal query execution plan, the database server determines, using a rule and/or cost based model, if the database query should be executed using the functional index. If the database server determines that the database query should be executed using the functional index, then the database query is executed with the functional index. On the other hand, if the database server determines that the database query should not be executed using the functional index, then the database server stores data that indicates that the functional index is not to be evaluated when the database query is executed. The stored data prevents the functional index from being used when the use of the functional index would not add to the efficiency of executing the database query.

In this way, a client of the database management system may take advantage of the functional index, even though the client did not reference the functional index in the database query. Thus, the client is sparred the burden of including a reference, in the database query, to any index that will be used when evaluating the database query, as existing database queries do not need to be modified to use a functional index. Consequently, a database query may be easier to create as there is no requirement that the database query includes a reference to the functional index to gain benefit of the functional index.

Using a Functional Index as a Primary Filter

Figure 2:
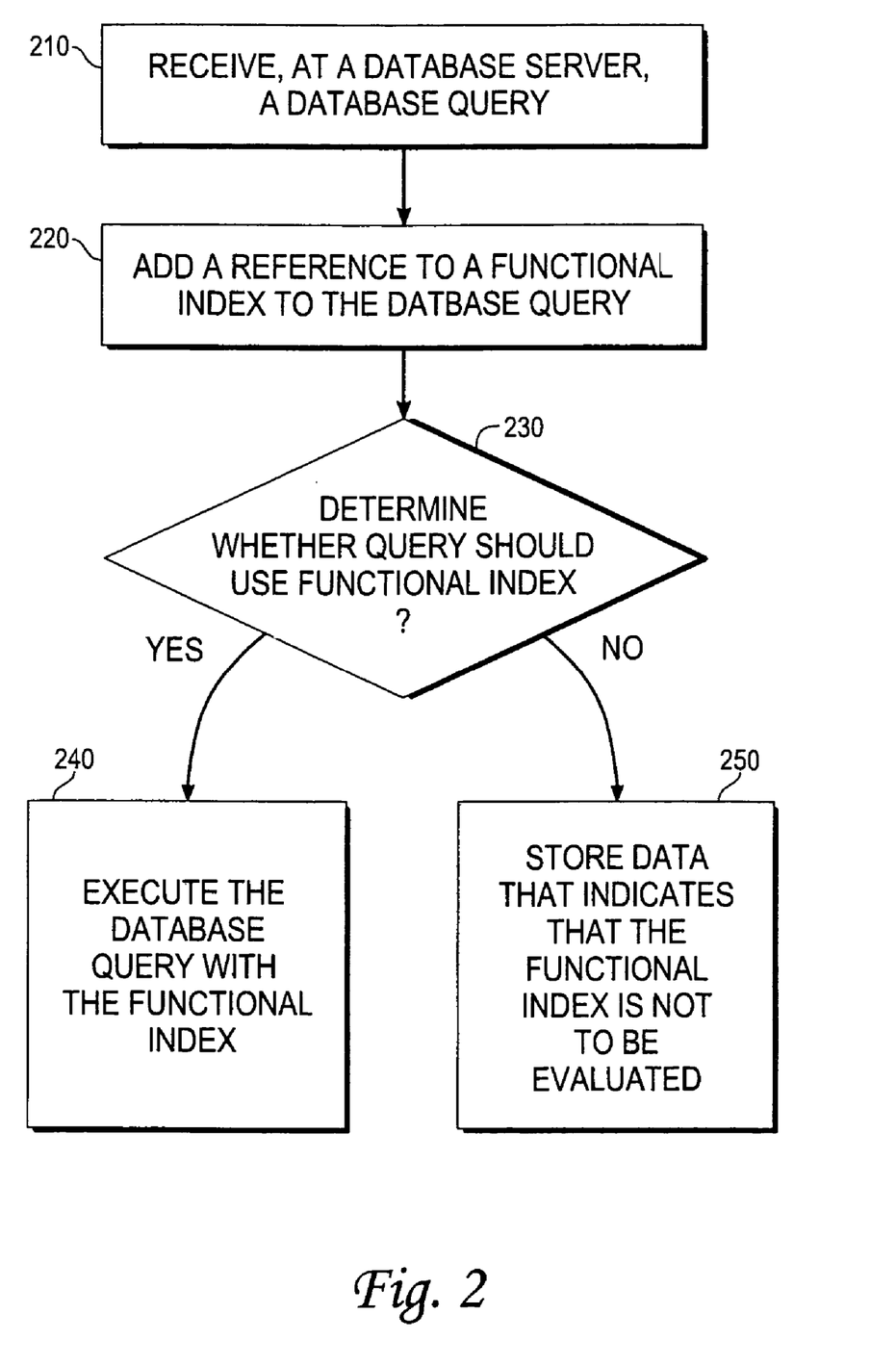
FIG. 2 is a flowchart illustrating the steps of using a functional index as a primary filter according to an embodiment.

FIG. 2 is a flowchart illustrating the steps of using a functional index as a primary filter according to an embodiment. By performing the steps of FIG. 2, embodiments may execute a database query using a functional index, even if the database query, as it was received by the database management system, does not contain a reference to the functional index. Advantageously, when a user cannot create an index on a column, e.g., because the index would violate key size constraints, embodiments of the invention allow database queries to be evaluated using the functional index without reference to the functional index in the database query.

Prior to performing the steps of FIG. 2, a functional index is created on a table of database 124. The created functional index is based on one or more columns. For example, a functional index named "idx1" may be created on a table named "t1" in database 124 by executing the SQL command shown below in example 1.

EXAMPLE 1 create index idx1 on t1 (substr(c1, 1, 5));

The index of example 1 shall be referenced below in discussion of further examples.

The steps of FIG. 2 shall now be explained below with reference to the block diagram of FIG. 1. In step 210, a database query is received that contains a reference to a column, but does not contain any reference to a functional index on the column. Client 110 may transmit the database query of step 210 over communications link 130 to be received by database server 122. The column referenced by the database query of step 210 is a column that a functional index is based upon.

Step 210 may be performed by database server 122 receiving the database query shown in example 2.

EXAMPLE 2 select c1 from t1 where c1='abc';

In Example 2, the database query references column c1 in the condition "where c1='abc,' but does not reference any functional index on column c1. After the database query of step 210 is received, processing proceeds to step 220.

In step 220, database server 122 adds to the database query received in step 210 a reference to the functional index on the column referenced by the database query. In an embodiment, step 220 is performed before a query optimizer component of database server 122 analyzes the database query, but after a type check procedure is performed on the database query by the database server 122.

Step 220 may be performed by database server 122 identifying a "where" clause in the database query that contains a reference to a particular column, and modifying the "where" clause to contain a reference to the functional index based on that column. The reference to the functional index that is added reflects the original condition of the received database query of step 210 (hereafter, the "original condition"). For example, the original condition of Example 2 is "c1='abc'." The database server 122 adds the reference to the functional index in the "where" clause using an "AND" operator.

Step 220 may be performed by database server 122 rewriting the query of example 2 to include the condition "substr (c1, 1, 5)=substr('abc', 1, 5)" in the where clause as shown below in example 3.

EXAMPLE 3 select c1 from t1 where where c1='abc' AND substr(c1, 1, 5)=substr('abc', 1, 5);

As example 3 shows, the "where" clause of the database query has been amended to recite the addition of an "AND" operator, and a reference to the functional index of example 1 that reflects the original condition. The new predicate is derived by applying the top function of the functional index expression (substr in this example), to both sides of the original condition. Note that the right hand side of the new predicate "substr('abc', 1, 5)" is a static expression (as it relies only on constant values), which may be simplified to 'abc.'

The functional index to which reference is made in step 220 is the functional index that is based on a column referenced by the database query. As the database query of Example 2 referenced column c1, and the functional index of example 1 is based on that column c1, reference to the functional index of example 1 is added in step 220.

The particular comparative operator included in the reference to the functional index added in step 220 may vary, as the evaluation of the functional index of which reference is added to in step 220 must be true for all rows where the original condition is true. As explained below, the particular comparative operator included in the reference to the functional index is based on the particular type of comparative operation performed in the original condition of the database query.

In equality comparisons (i.e., those comparisons wherein the comparative operator is a "=" sign), the comparative operator remains the same. In other words, if the original condition involved an equality comparative operator, then the reference to the functional index also contains an equality comparative operator, e.g., an equality comparative operator ("=") is used in the original condition of example 2 and in the reference to the functional index added to the database query of example 3.

In the case of non-equality comparisons, a different comparative operator than the original is added. Consider example 4 and example 5.

EXAMPLE 4 select c1 from t1 where c1<1 'abcdef';
may be amended in step 220 as:
select c1 from t1 where c1<'abcdef' AND substr (c1, 1,5)<=substr('abcdef', 1,5);

EXAMPLE 5 select c1 from t1 where a1>a2
may be amended in step 220 as:
select c1 from t1 where a1>a2 AND substr(a1, 1, 5)>=substr(a2, 1, 5)

The comparative operator included in the reference to the functional index in both example 4 and example 5 differs than the comparative operation in the original condition because the substring values as evaluated by the functional index may be equal, but the original values are not equal. Thus, in example 4, while the original condition contains a less than comparative operation (<), the comparative operator in the reference to the functional index is a less than or equals sign (<=). Also, in example 5, while the original condition contains a greater than comparative operation (>), the comparative operator in the reference to the functional index is a greater than or equals sign (>=). Note that the rules presented above regarding determining the comparative operator correspond to a functional index which uses the "substr(<arg>, 1, n)" expression, i.e., a string prefix expression. Other rules for determining the comparative operator may differ depending upon the particular functional index employed by the embodiment.

Embodiments may make use of numerous types of functional indexes, and are not limited to any particular type of functional index. For example, step 220 is explained above with reference to an example involving a substring function. Other embodiments may employ a functional index based on a hash function, which is a function that assigns a data item distinguished by some "key" into one of a number of possible "hash buckets" in a hash table. The hash function may be combined with another more precise function. A hash functional index may be used by embodiments to evaluate equality operators for collection type columns. For example, as shown below in example 6, if there exists a functional index "hash (col1)," the predicate "col1=<value>" will be amended in step 220 as "col1=<value>AND hash(col1)=hash(<value>)."

EXAMPLE 6 select c1 from t2 where col1='xyz';
may be amended in step 220 as:
select c1 from t2 where col1='xyz' AND hash(col1)=hash ('xyz');

After the database server 220 adds to the database query a reference to the functional index in step 220, processing proceeds to step 230.

In step 230, a determination is made as to whether the database query should be executed using the functional index. Database server 122 performs step 230, e.g., step 230 may be performed by a query optimizer component of database server 122. The determination of step 230 may be positive if the database server 122 determines that the functional index is usable by the database server 122. The determination of step 230 may be negative if the database server 122 determines that the functional index is in an unstable state. In such a case, the functional index cannot be used, so it is not necessary to go through the overhead of attempting to use the functional index when it cannot be used. The primary consideration as to whether or not to use the functional index during query execution is a question of optimization. In other words, if using the functional index would result in the most optimal query execution plan, compared to other available alternatives, then the functional index is used during query execution.

If the determination of step 230 is positive (the database query should be executed using the functional index), then processing proceeds to step 240. If the determination of step 230 is negative (the database query should not be executed using the functional index), then processing proceeds to step 250.

In step 240, as the determination of step 230 is positive (the database query should be executed using the functional index), the database query is executed with the functional index. The database server 122 uses the execution plan in executing the database query against the database 124.

The database server 122 may initially identify a set of rows that satisfy a condition specified by the functional index. After the database server 122 identifies the set of rows that satisfy the condition specified by the functional index, the database server 122 determines which rows in the identified set of rows satisfies all the conditions specified in the database query. For example, consider the database query of example 3. The database server 122 may initially a first set of rows that satisfy the condition of "substr(c1, 1, 5)='abc'." Thereafter, the database server 122 may identify a second set of rows in the first set of rows that satisfies the condition of the original condition, namely "c1='abc'."

In step 250, as the determination of step 230 is negative (the database query should not be executed using the functional index), data that indicates that the functional index is not to be evaluated when the database query is executed is stored. Thus, in step 250, database server 122 stores the data that indicates that the functional index is not to be evaluated when the database query is executed. Thereafter, when database server 122, or another entity, executes the database query, the functional index will not be used in evaluating the database query.

In an embodiment, the data stored in step 250 causes the functional index to be evaluated as true for all rows. In another embodiment, the data stored in step 250 causes the "where" clause of the database query to be modified such that reference to the functional index is removed.

After either the performance of step 240 or step 250, the database server 122 has determined which records stored in database 124 satisfy the database query received in step 210. It is more efficient for the database server 122 to perform step 240, rather than step 250, because the functional index may be used as a primary filter to reduce the number of records that the database server 122 needs to search to determine which records stored in database 124 satisfy the conditions specified in the database query received in step 210. The efficiency in performing step 240 is realized by the execution of the database query with a functional index, even if the database query, as it was received by database server 122, does not contain a reference to the functional index.

Implementing Mechanisms

Figure 3:
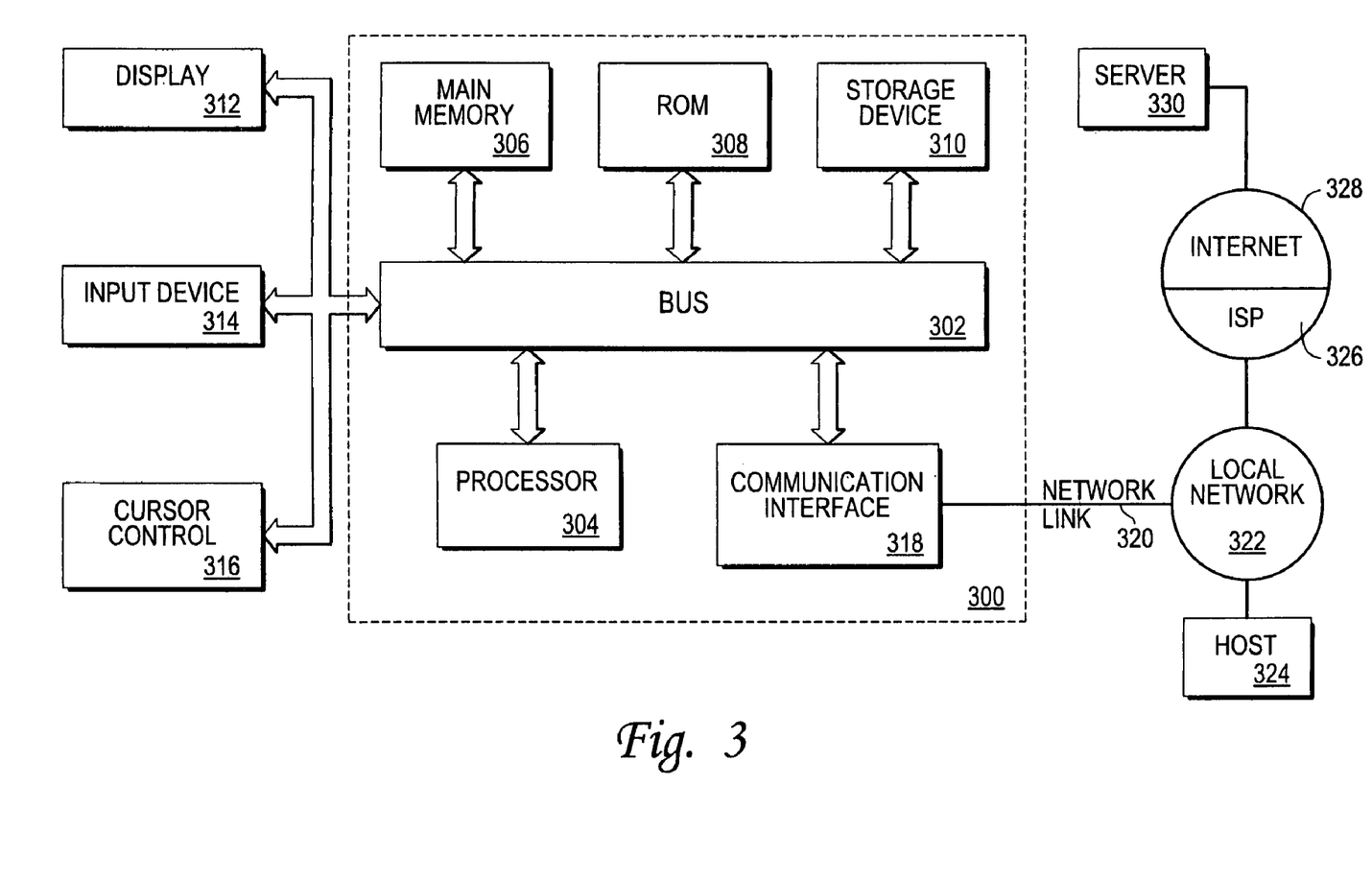
FIG. 3 is a block diagram that illustrates a computer system upon which an embodiment of the invention may be implemented.

In an embodiment, client 110, database server 122, and database 124 may each be implemented using a computer system. FIG. 3 is a block diagram that illustrates a computer system 300 upon which an embodiment may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising:
   receiving, at a database server, a database query that has a WHERE clause containing a reference to a column, wherein the WHERE clause does not contain any reference to a function on which a functional index on the column is based;
   wherein the reference to the column occurs in a first condition in the WHERE clause of the database query;
   the database server creating an amended database query that includes at least one WHERE clause, wherein the at least one WHERE clause includes at least: (a) the first condition, and (b) an added second condition that contains a function call to the function;
   executing the amended database query;
   based on the function call to the function in the at least one WHERE clause of the amended database query, using the functional index as an index during execution of the amended database query; and
   outputting a result set based, at least in part, on the execution of the amended database query;
   wherein the column is a column of a table in a database that is managed by the database server;
   wherein the method is performed by one or more computing devices.

2. The method of claim 1, further comprising:
   determining whether the amended database query should be executed using the functional index;
   wherein the step of using the functional index is performed in response to a determination that the amended database query should be executed using the functional index.

3. The method of claim 1, wherein the reference to said column is a first reference to said column, wherein the WHERE clause is a first WHERE clause, and wherein the method further comprises:
   receiving, at the database server, a second database query that has a second WHERE clause containing a second reference to said column, wherein the second WHERE clause does not contain any reference to said function on which said functional index on the column is based;
   determining whether the amended second database query should be executed using the functional index;
   if the amended second database query should not be executed using the functional index, storing data that indicates that the functional index is not to be evaluated when the amended second database query is executed; and
   outputting a second result set based, at least in part, on the execution of the amended second database query.

4. The method of claim 2, wherein the step of using the functional index further comprises:
   using the functional index to identify a set of rows that satisfy said second condition.

5. The method of claim 1, wherein the function is a hash function.

6. The method of claim 1, wherein the function is a sub-string function.

7. The method of claim 1, wherein the first condition includes a particular type of comparative operation involving data from the column, and wherein the second condition includes a comparative operator based on the particular type of comparative operation.

8. The method of claim 7, wherein the comparative operator is a less than or equal to comparative operator, and wherein the comparative operation is a less than comparative operation.

9. The method of claim 7, wherein the comparative operator is a greater than or equal to comparative operator, and wherein the comparative operation is a greater than comparative operation.

10. A machine-readable storage medium storing one or more sequences of instructions, wherein execution of the one or more sequences of instructions by one or more processors causes the one or more processors to perform the steps of:
    receiving, at a database server, a database query that has a WHERE clause containing a reference to a column, wherein the WHERE clause does not contain any reference to a function on which a functional index on the column is based;
    wherein the reference to the column occurs in a first condition in the WHERE clause of the database query;
    the database server creating an amended database query that includes at least one WHERE clause, wherein the at least one WHERE clause includes at least: (a) the first condition, and (b) an added second condition that contains a function call to the function;
    executing the amended database query;
    based on the function call to the function in the at least one WHERE clause of the amended database query, using the functional index as an index during execution of the amended database query; and outputting a result set based, at least in part, on the execution of the amended database query;

wherein the column is a column of a table in a database that is managed by the database server.

11. The machine-readable storage medium of claim 10, wherein execution of the one or more sequences of instructions by the one or more processors causes the one or more processors to further perform the steps of:

determining whether the amended database query should be executed using the functional index;

wherein the step of using the functional index is performed in response to a determination that the amended database query should be executed using the functional index.

12. The machine-readable storage medium of claim 10, wherein the reference to said column is a first reference to said column, wherein the WHERE clause is a first WHERE clause, and wherein execution of the one or more sequences of instructions by the one or more processors causes the one or more processors to further perform the steps of:

receiving, at the database server, a second database query that has a second WHERE clause containing a second reference to said column, wherein the second WHERE clause does not contain any reference to said function that was used to create said functional index on the column;

determining whether the amended second database query should be executed using the functional index;

if the amended second database query should not be executed using the functional index, storing data that indicates that the functional index is not to be evaluated when the amended second database query is executed; and outputting a second result set based, at least in part, on the execution of the amended second database query.

13. The machine-readable storage medium of claim 11, wherein the step of using the functional index further comprises:

using the functional index to identify a set of rows that satisfy said second condition.

14. The machine-readable storage medium of claim 10, wherein the function is a hash function.

15. The machine-readable storage medium of claim 10, wherein the function is a substring function.

16. The machine-readable storage medium of claim 10, wherein the first condition includes a particular type of comparative operation involving data from the column, and wherein the second condition includes a comparative operator based on the particular type of comparative operation.

17. The machine-readable storage medium of claim 16, wherein the comparative operator is a less than or equal to comparative operator, and wherein the comparative operation is a less than comparative operation.

18. The machine-readable storage medium of claim 16, wherein the comparative operator is a greater than or equal to comparative operator, and wherein the comparative operation is a greater than comparative operation.

* * * * *

UNITED STATES PATENT AND TRADEMARK OFFICE
CERTIFICATE OF CORRECTION

| | | |
|---|---|---|
| PATENT NO. | : 7,908,267 B2 | Page 1 of 1 |
| APPLICATION NO. | : 10/929065 | |
| DATED | : March 15, 2011 | |
| INVENTOR(S) | : Jenkins, Jr. et al. | |

It is certified that error appears in the above-identified patent and that said Letters Patent is hereby corrected as shown below:

On cover page, in column 2, under "Other Publications", line 2, delete "databae" and insert -- database --, therefor.

On page 2, in column 2, under "Other Publications", line 2, delete "internatinal" and insert -- international --, therefor.

In column 5, line 8, before "c1='abc'" delete "where".

Signed and Sealed this
Fourth Day of October, 2011

David J. Kappos
*Director of the United States Patent and Trademark Office*